(12) United States Patent
Fischer

(10) Patent No.: US 9,049,958 B2
(45) Date of Patent: Jun. 9, 2015

(54) BREWING APPARATUS WITH CAPSULE RECOGNITION

(71) Applicant: Eugster/Frismag AG, Amriswil (CH)

(72) Inventor: Daniel Fischer, Romanshorn (CH)

(73) Assignee: Eugster/Frismag AG, Amriswil (CH)

( * ) Notice: Subject to any disclaimer, the term of this patent is extended or adjusted under 35 U.S.C. 154(b) by 0 days.

(21) Appl. No.: 13/782,186

(22) Filed: Mar. 1, 2013

(65) Prior Publication Data

US 2013/0174745 A1 Jul. 11, 2013

Related U.S. Application Data

(63) Continuation of application No. PCT/EP2011/004324, filed on Aug. 29, 2011.

(51) Int. Cl.
*A47J 31/06* (2006.01)
*A47J 31/40* (2006.01)
*A47J 31/36* (2006.01)

(52) U.S. Cl.
CPC ............ *A47J 31/407* (2013.01); *A47J 31/3633* (2013.01)

(58) Field of Classification Search
CPC .............................. A47J 31/407; A47J 31/3633
USPC ........ 99/295, 297, 279, 287, 289, 300, 302 P, 99/302 R; 221/22, 172, 290, 291, 295, 221/301; 426/431, 478
See application file for complete search history.

(56) References Cited

U.S. PATENT DOCUMENTS

| | | | |
|---|---|---|---|
| 4,744,491 A * | 5/1988 | Bani et al. | ...................... 221/172 |
| 8,813,634 B2 | 8/2014 | Yoakim et al. | |
| 2010/0173056 A1* | 7/2010 | Yoakim et al. | ................ 426/433 |
| 2010/0186599 A1 | 7/2010 | Yoakim et al. | |
| 2014/0360377 A1 | 12/2012 | Yoakim et al. | |

FOREIGN PATENT DOCUMENTS

| | | |
|---|---|---|
| CN | 101677706 A | 3/2010 |
| EP | 0208092 A1 | 1/1987 |
| EP | 1495702 A1 | 1/2005 |
| WO | 2008/148601 A1 | 12/2008 |

* cited by examiner

*Primary Examiner* — Dana Ross
*Assistant Examiner* — Joseph Iskra
(74) *Attorney, Agent, or Firm* — McNees Wallace & Nurick LLC

(57) ABSTRACT

An apparatus for producing brewed beverages, having a brewing unit which has a brewing chamber, into which a capsule can be introduced through an introduction shaft.

8 Claims, 6 Drawing Sheets

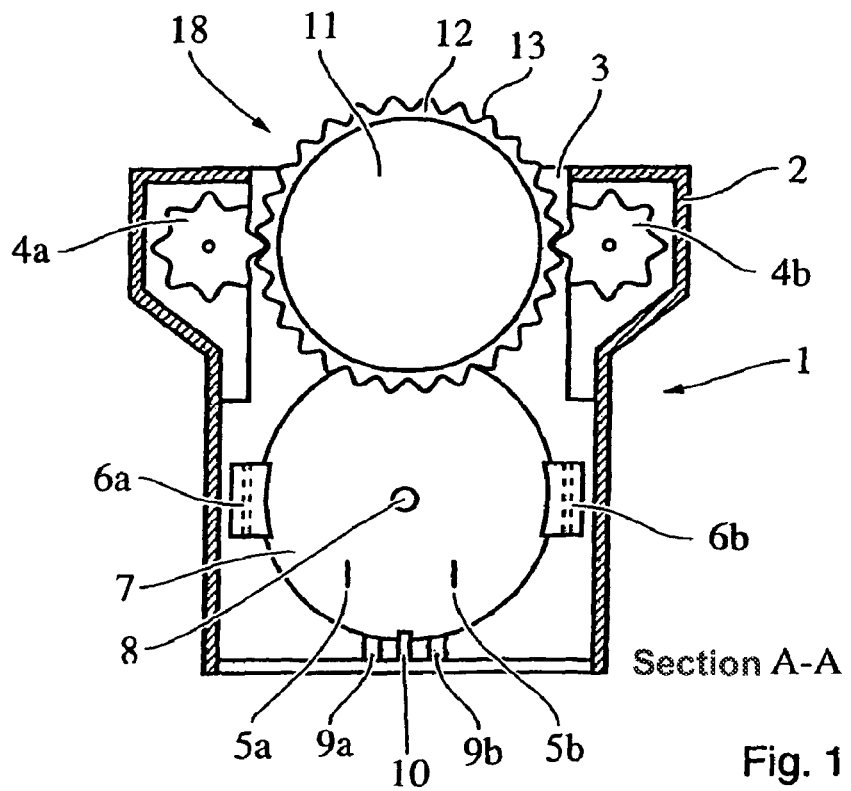
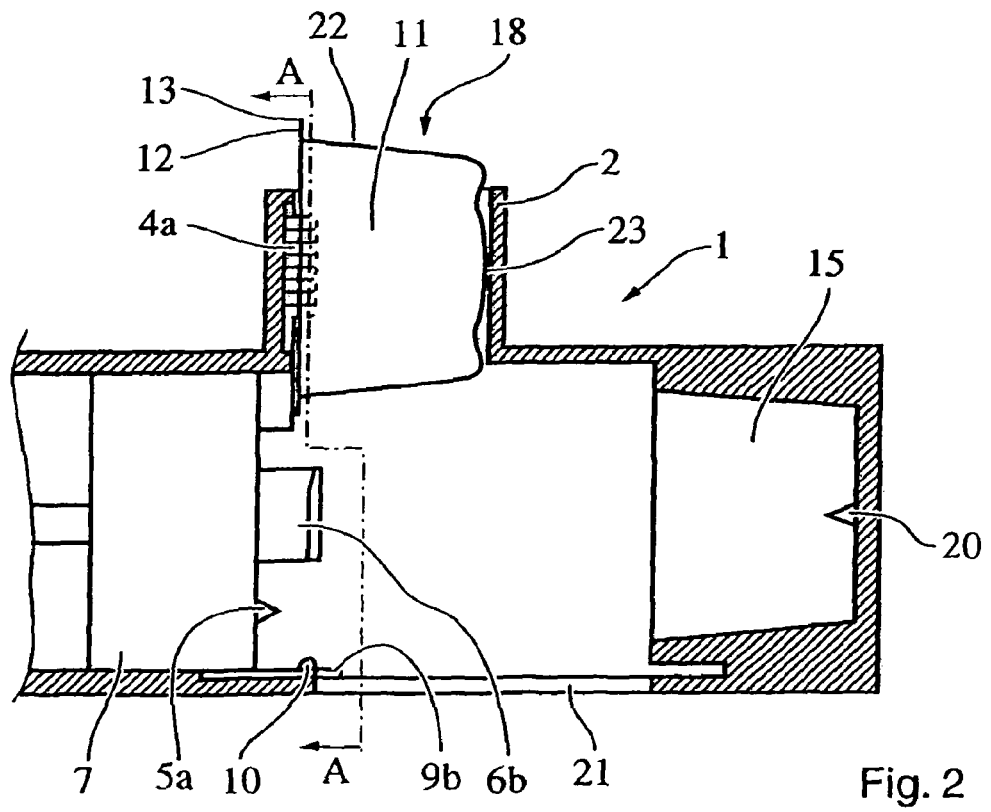

BREWING APPARATUS WITH CAPSULE RECOGNITION

CROSS REFERENCE TO RELATED APPLICATIONS

This application is a Continuation of International Application No. PCT/EP2011/004324, filed on Aug. 29, 2011, entitled BREWING APPARATUS WITH CAPSULE RECOGNITION which application is hereby incorporated by reference in its entirety.

BACKGROUND

The present invention relates to an apparatus for preparing brewed beverages with a brewing unit, having a brewing chamber, into which by means of a insertion chute a capsule is insertable.

Such devices are well known from the prior art and are used for the preparation of coffee, espresso, cappuccino, tea or other drinks, but also soups, ready meals and the like. In these devices, a liquid, in particular hot water, flows through a capsule, which comprises the respective raw material, for example the ground coffee, and thereby, the beverage raw material is extracted and/or dissolved and thus the beverage or food to be prepared is prepared. For such devices, there exists a plurality of capsules, wherein in general, only a certain capsule is suitable for a particular device such that it is ensured that neither the device nor the user gets hurt.

It was therefore an object of the present invention to provide an apparatus for preparing brewed beverages or food, wherein it is ensured that the apparatus can only be operated with suitable capsules.

SUMMARY

The object is achieved with an apparatus for preparing brewed beverages with a brewing unit, having a brewing chamber into which by means of a insertion chute a capsule is insertable, wherein a means is provided in the insertion chute, which is driven, preferably rotatably, by the capsule and/or which alters the falling motion of the capsule.

The present invention relates to an apparatus for the preparation of brewed beverages, such as described above. In this device, preferably one-time capsules are used that have a deep-drawn base member having an edge. This edge is usually used as sealing surface for a cover foil, which closes the capsule airtight and aroma-tight, with the capsule, after being filled with the raw material, being closed by the cover foil to retain the capsule in a defined position, as a stop surface, so that the capsule does not slip too deeply into the brewing chamber, as a sealing surface and/or as a contact surface in order to remove the capsule from the brewing chamber. Preferably, the base element is designed conically. Preferably, the edge is annular.

The inventive apparatus is provided with a brewing unit, which comprises a brewing chamber. In this brewing chamber, which is preferably provided in two parts, wherein the two parts are preferably convertible relative to each other from an open to a closed position and vice versa, the capsule comprising the respective raw material is inserted for the preparation of the beverage. Thereafter, the brewing chamber is preferably closed, the capsule is preferably opened and a liquid, in particular hot water, flows through the capsule and thus the beverage or food is prepared. Subsequently, the brewing chamber is opened again, and the used capsule is removed by a waste chute into a waste container, so that the brewing chamber is available for the preparation of another beverage or food.

This apparatus now comprises, according to the present invention, a insertion chute, which is generally oriented vertically and through which the user inserts the capsule in a defined position in the open brewing chamber. According to the present invention, provision is made for a means being arranged in the insertion chute, wherein the means is driven, preferably rotatably, by the capsule and/or the means alters the falling motion of the capsule. The means causes in particular that a capsule which is too large, in particular the edge thereof being too large, remains stuck in the insertion chute and thus cannot pass into the brewing chamber. In this case, the means acts as a rotating lock. Preferably, the apparatus according to the present invention is designed in such a way that a capsule being too small, in particular a capsule with an edge being too small, is insertable into the insertion chute, but cannot hold in the brewing chamber, so that it falls directly into a waste container.

Alternatively or additionally, the brewing unit, in particular the pump, which provides the hot water, cannot be put into operation if the means has not been driven by the capsule. Thereby, additional security risks are avoided.

Preferably, the means sets the capsule in rotation and/or deflects the capsule from its vertical trajectory. If such a rotational movement does not occur, and/or if the capsule is not deflected from its vertical trajectory, the capsule either remains stuck in the insertion chute and/or falls through the brewing chamber.

Preferably, the means interacts with the capsule in a positive-locking manner and/or by frictional locking. Most preferably, the means interacts with the edge of the capsule. For that purpose, the edge of the capsule comprises preferably complementary frictional locking and/or positive locking means. Only by the frictional locking or the positive locking, the rotating means is driven and thus enables the capsule passing through the insertion chute into the brewing chamber. Preferably, a transmitter and/or transducer is arranged at the rotating means, wherein the transmitter and/or transducer is connected to a controller. This transmitter and/or transducer detects a movement of the means, in particular a rotational movement, and transmits a corresponding signal to the controller. Preferably, the control does only release the brewing unit, in particular the pump of the brewing unit, if a certain movement of the means has been detected.

Preferably, the means is a pinion which is most preferably arranged in the edge region of the insertion chute and comprises teeth with an arbitrary number and/or an arbitrary shape. Preferably, this pinion interacts with a toothed ring, wherein the toothed ring is provided on the capsule, in particular on the edge of the capsule, wherein the toothed ring interacts with at least one, preferably at least two teeth of the pinion in a positive locking manner during the falling motion. The teeth of the pinion and the toothed ring need to be coordinated, as in a gear mechanism, so that they can jointly move in a positive locking manner. If this is not the case, the capsule blocks the insertion chute.

Preferably, the brewing chamber consists of a first and a second part, wherein at one part at least one, preferably two, support arms are provided, which at least partially interact in particular with the front side of the toothed ring for holding, and thereby prevent the capsule falling into a waste container before the capsule has been used for the beverage or food preparation. In case of a capsule being too small, the holding arms do not act retentively, so that the capsule, immediately after it has been inserted into the brewing chamber, falls into the waste container is, before the brewing chamber can be closed. This ensures that even capsules being too small cannot be used in the apparatus according to the present invention, so that also in this regard security risks are avoided. Preferably, the retaining means are formed in such a way that they center the capsule between them and form a gauge for the capsule configuration. It is in particular ensured by this embodiment that a capsule being too small, in particular a capsule with an edge being too small, is not retained in the brewing chamber, but securely unscrews itself from the brewing chamber.

In the following, the invention is explained in detail based on the FIGS. 1 to 9. These explanations are merely illustrative and do not limit the general inventive concept.

BRIEF DESCRIPTION OF THE DRAWINGS

FIGS. 1 and 2 show a first embodiment of an apparatus according to the present invention.

DETAILED DESCRIPTION

Figure 3:
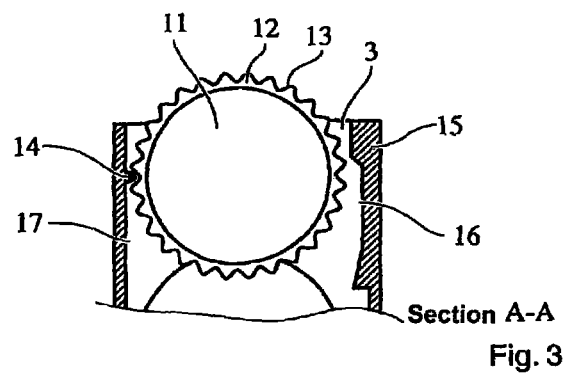
FIGS. 3 to 5 show further embodiments of an apparatus according to the present invention.

FIGS. 1 and 2 show a first embodiment of the apparatus for preparing brewed beverages. In this apparatus, capsules 11 are used, wherein the capsules comprise a conical base element 22 containing the raw material and having an edge 12. The base element 22 is usually closed by a cover foil, wherein the cover foil is in particular attached to the edge 12, preferably sealed. The apparatus comprises a brewing unit 1, which consists substantially of a brewing chamber 7, 15. The brewing chamber comprises a first part 7 and a second part 15, which are provided to be movable relative to each other, so that the brewing chamber is convertible from an open state, shown in FIG. 2, into a closed state. In the present case, the second part of the brewing chamber 15 is provided stationary and the first part may, for example driven by a knee lever, be shifted in the direction of the second part 15 to close the brewing chamber. During closing and/or after the brewing chamber 7, 15 has been closed, the capsule bottom 23 is opened by a puncturing means 20, here a puncturing spike, and the cover foil is preferably opened with an opening means, for example with an puncturing knife 5a, 5b, so that a liquid, in particular hot water, can flow through the capsule 11. The capsule may also comprise at least partially corresponding openings prior to the insertion in to the insertion chute. The water flows through a water supply 8 into the capsule, in particular through its cover, and exits the capsule in its bottom region 23. Before the first part of the brewing chamber 7 is displaced in the direction of the second part of the brewing chamber, a capsule 11, which contains the beverage raw material, is inserted through a insertion chute 18 into the brewing unit. In particular, the capsule is inserted through a insertion chute opening 3 and is subsequently guided through the insertion chute housing 2 in such a way that during its falling movement into the brewing unit, it maintains its orientation such as shown in FIG. 2. In particular, the insertion chute housing comprises a slot for this purpose, which guides the edge 12 of the capsule in at least one and preferably two directions of space. After the capsule has passed through the insertion chute 18, the capsule falls into the brewing unit 1 and its falling movement is interrupted by the capsule falling barrier 10, which is provided at the brewing unit 1 or at the first part 7. To prevent the capsule turning away clockwise from the first part 7 of the brewing chamber due to its center of gravity and subsequently falling in the waste chute, holding means 6a, 6b are provided at the first part 7, wherein the holding means 6a, 6b interact with the edge 12 of the capsule to prevent this movement. Once the capsule 11 is positioned on the capsule falling barrier 10 and abuts the holding means 6a, 6b, the first part 7 of the brewing chamber can be transported in the direction of the second part 15 of the brewing chamber and take the capsule along in the process. During this transport, the capsule is then preferably not anymore positioned on the capsule falling barrier 10, but is positioned instead preferably on the capsule transport supports 9a, 9b. By means of the first part 7, the capsule is then inserted into the second part 15 and the two parts 7, 15 are sealingly closed. Subsequently or in the process, the capsule may be opened and the preparation of the beverage or foodstuff can take place. After the brewing process is complete, the brewing chamber is opened again and the part is moved to its original position. In the process, it takes along the used capsule for a short path length. As soon as the capsule is at least partially situated above the waste chute 21, the capsule will fall into it.

According to the present invention, provision is made for a means, here two pinions 4a, 4b, being provided in the insertion chute 18, wherein the teeth of the pinions 4a, 4b are formed in such a way that they interact in a positive locking manner with a toothed ring 13, which is provided at the capsule edge, such that the teeth are driven by the capsule when the capsule falls. If the capsule does not have such a toothed ring 13 and/or if the teeth of the toothed ring 13 are not compatible with the teeth of the pinions 4a, 4b concerning their number and/or shape, the capsule will get stuck in the insertion chute and it is prevented that a capsule, which could lead to an endangerment of the apparatus according to the present invention or the user, cannot be introduced into the brewing chamber. The toothed ring 13 and the pinions 4a, 4b are preferably matched so that at least two teeth of the pinion engages with the toothed ring 13. Is the capsule edge 12, however, so small that it does not engage with the teeth 4a, 4b and it does not rotationally drive the teeth 4a, 4b, the edge will not interact with the capsule holding means 6a, 6b, so that the capsule will rotate clockwise and fall into the waste chute 21 immediately encountering the capsule falling barrier 10. Thereby as well, it is ensured that the apparatus is not operated with a false capsule.

FIG. 3 shows a further embodiment of the apparatus according to the present invention. In the present case, a locking means 14, for example a locking cam, is provided on the inner wall 17 of the insertion chute 18, wherein the locking means 14 interacts with the toothed ring 13 of the capsule edge. Thereby, the capsule hits on said locking means 14, and is thus put in a rotary motion, and rotates along the capsule insertion contour 16 into the insertion chute and thus into the brewing chamber. However, if the capsule edge does not comprise a toothed structure, the capsule will get stuck in the insertion chute. With respect to capsules being too small, it is referred to the explanations of the FIGS. 1 and 2.

Figure 4:
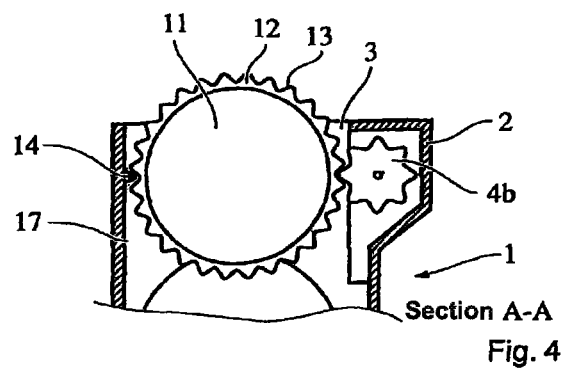

FIG. 4 shows substantially the embodiment of the apparatus according to FIG. 3, wherein in the present case, a pinion gear 4b is provided, which prevents an insertion of the capsule 11 into the insertion chute, when the toothed ring 13 is not compatible with the teeth of the pinion gear 4b. Regarding the design of the toothed ring 13 and the teeth of the pinion 4b, it is referred to the explanations of the FIGS. 1 and 2.

Figure 5:
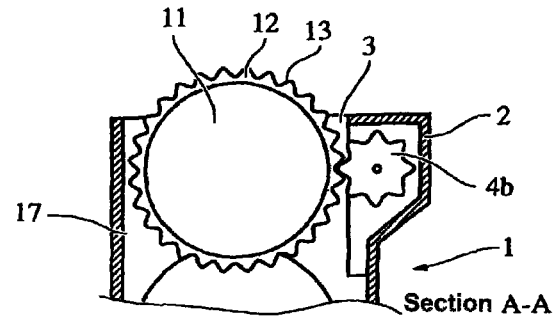
Figure 6:
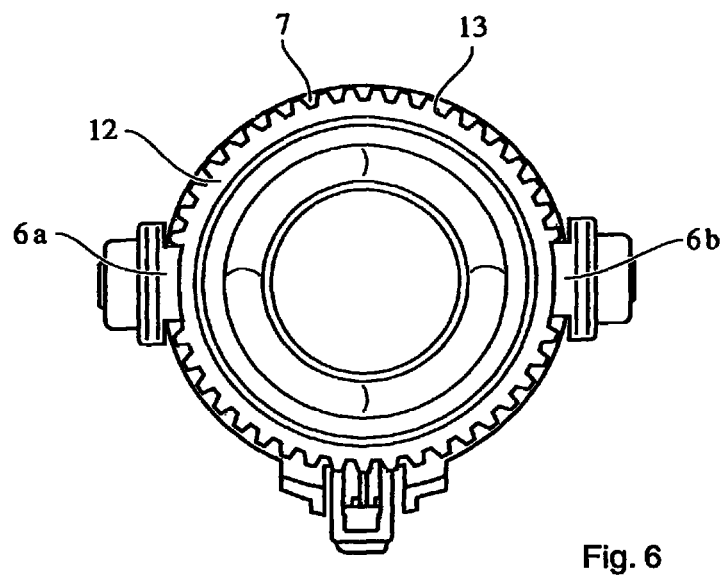
FIGS. 6 to 9 show the capsule in the brewing chamber.
Figure 7:
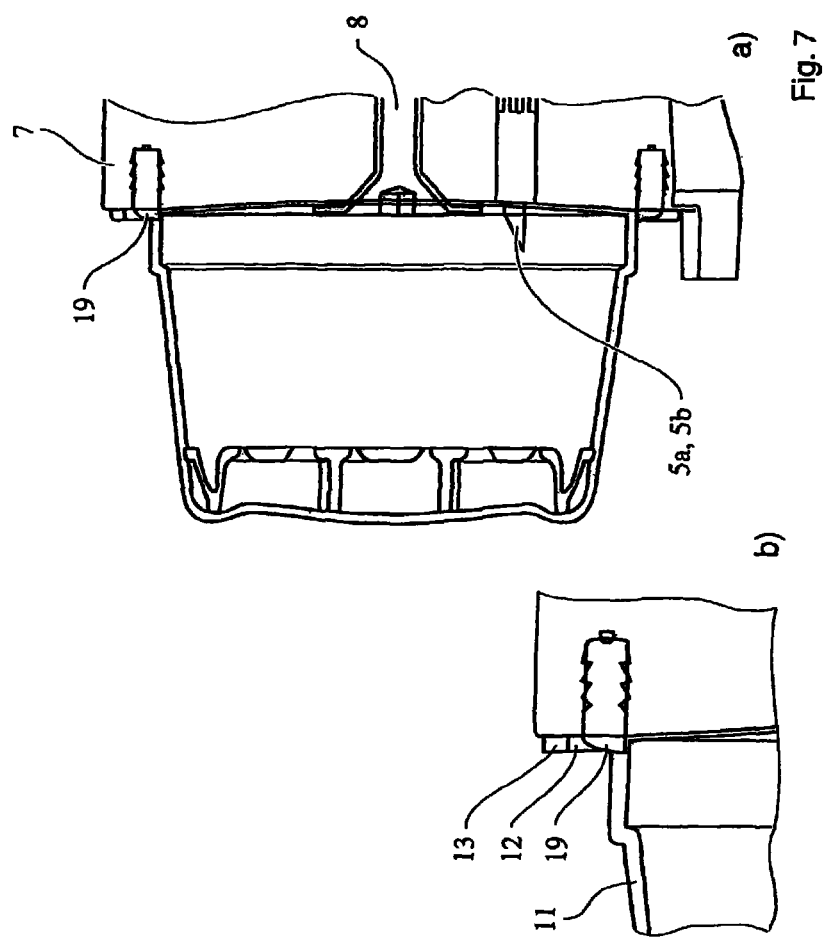
Figure 8:
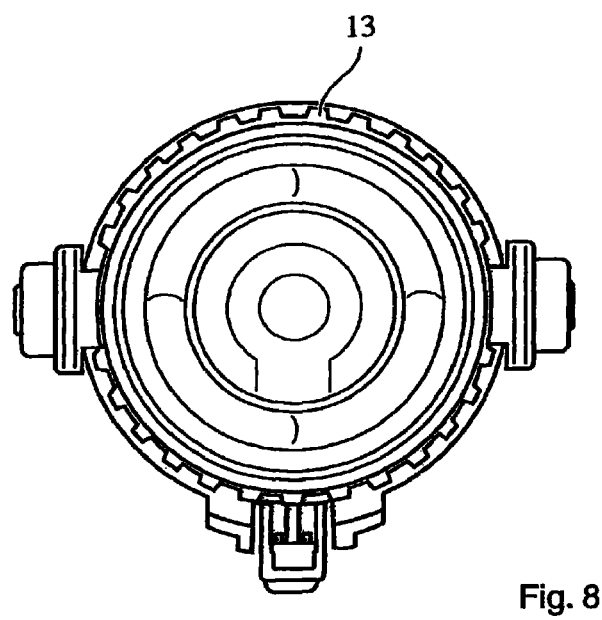
Figure 9:
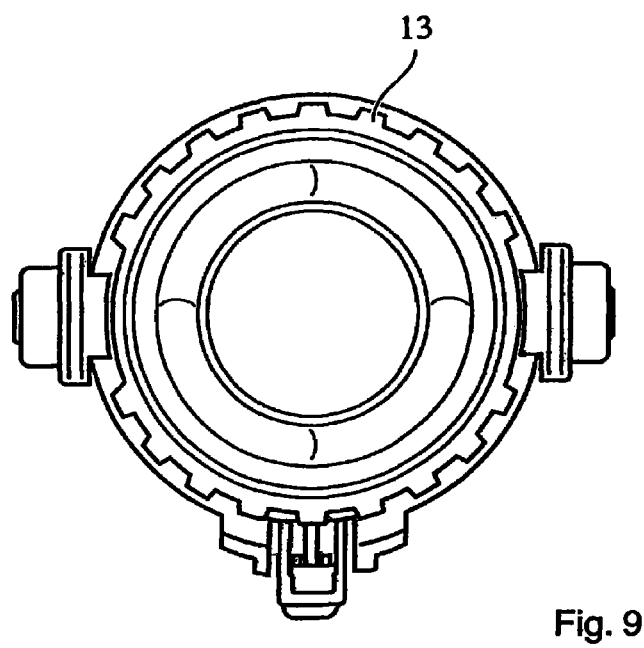

FIG. 5 corresponds substantially to the embodiment shown in FIG. 1, but only with one locking pinion, so that it is referred to the statements made there. In the present case, the locking means 4a has been omitted.

All of the embodiments with a pinion 4a and/or 4b have in common that as a rule at the latest when the capsular edge is engaged with a tooth of the pinion, and the teeth of the pinion and of the capsule are not compatible, a falling movement is not permitted. Similarly, it must be possible for at least two teeth of the pinion engaging with the edge 13 of the capsule, for the capsule to fall through the insertion chute and thereby drive the pinion. A transmitter and/or transducer may be provided at the pinion, wherein the transmitter and/or transducer detects the rotational movement and transmits it to a controller. If this rotational movement includes at least a given segment of a circle, the controller will for example release or activate the brewing chamber. A person skilled in the art will appreciate that frictional locking means may be provided at the edge of capsule as well, cooperating frictionally locking with a means such as a wheel and drive the wheel, wherein this movement is being detected in turn and thereby the brewing unit is released or activated.

FIGS. 6 to 9 show capsules with different toothed rings 13 at their capsule edges 12. In the embodiment shown in FIG. 6, the toothed ring comprises 45 teeth, in the embodiment shown in FIG. 8 29 teeth and in the embodiment shown in FIG. 9 only 22 teeth. It can clearly be seen in the FIGS. 6, 8 and 9 that the holding means 6a, 6b interact with the edge 12 of the capsule 11, in particular with the part in which the toothed ring 13 is provided. Therefore, if this toothed ring 13 is not provided for, the capsule will rotate out of the paper plane due to its center of gravity and falls into the waste chute 21. As it can be seen, in particular in FIG. 7, a seal 19 is provided at the first part 7 of the brewing chamber 7, wherein it is ensured with the seal that the water coming from the water supply 8, flows into the capsule, through the holes made by the opening means 5a, 5b, and not around the outside. This seal 19 cooperates with the part of the edge 12 of the capsule, which is arranged on the inside of the toothed ring 13.

The invention claimed is:

1. Apparatus for preparing brewed beverages with a brewing unit, comprising a brewing chamber into which by means of an insertion chute a capsule is insertable, wherein a means is provided in the insertion chute, wherein the means is driven by the capsule, wherein the means is a pinion positioned in the insertion chute.

2. The apparatus according to claim 1, wherein the means sets the capsule in rotation or deflects the capsule from its vertical trajectory.

3. The apparatus according to claim 1, wherein the capsule positively locks with the means.

4. The apparatus according to claim 1, wherein the means acts together with the edge of the capsule.

5. The apparatus according to claim 1, wherein a transmitter or transducer is arranged on the means wherein the transmitter or transducer is connected with a control.

6. The apparatus according to claim 1, wherein the capsule comprises a toothed ring, which acts together in a positive locking manner with at least two teeth of the pinion during the falling motion of the capsule.

7. The apparatus according to claim 6, wherein the brewing chamber consists of a first and a second part and in that at least one part of one holding arm is provided, which at least temporarily acts together with a front side of the toothed ring for holding the capsule.

8. The apparatus according to claim 1, wherein the means is rotatably driven by the capsule.

\* \* \* \* \*